United States Patent

[11] 3,621,036

[72] Inventors Norman P. Jensen
Watchung;
Thomas B. Windholz, Westfield, both of N.J.

[21] Appl. No. 803,048
[22] Filed Feb. 27, 1969
[45] Patented Nov. 16, 1971
[73] Assignee Merck & Co., Inc.
Rahway, N.J.

[54] DERIVATIVES OF ZEARALANE
17 Claims, No Drawings

[52] U.S. Cl. 260/343.2 F, 424/279
[51] Int. Cl. C07d 9/00
[50] Field of Search 260/343.2 F

[56] References Cited

UNITED STATES PATENTS

| | | | |
|---|---|---|---|
| 3,373,026 | 3/1968 | Hodge et al. | 260/343.2 |
| 3,373,039 | 3/1968 | Hodge et al. | 260/343.2 X |

*Primary Examiner*—John M. Ford
*Attorneys*—I. Louis Wolk, J. Jerome Behan and F. M. Mahon

ABSTRACT:

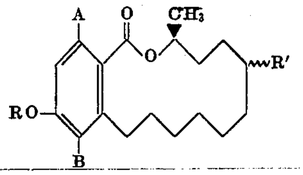

wherein A is a member selected from the group consisting of hydrogen, hydroxy, and —OR; R is a member of the group consisting of hydrogen, lower alkyl, aralkyl, lower alkanoyl and benzol; B is a member of the group consisting of hydrogen and nitro, provided that B cannot be nitro when A is hydrogen; and R' is a member of the group consisting of $-CH_2OH$, —CHO, COOR'' and $-CH_2COOR$ wherein R'' is a member of the group consisting of hydrogen, lower alkyl and aralkyl, are administered orally and parenterally to animals in order to achieve an anabolic and estrogenic response such as increasing the growth rate of meat-producing animals.

DERIVATIVES OF ZEARALANE

This invention relates to new and useful compositions of matter classifiable in the field of organic chemistry as 7'-hydroxymethyl, 7'-formyl, 7'-carboxy and 7'-carbomethoxymethyl derivatives of zearalane 6-(10-hydroxyundecyl)-β-resorcyclic acid-μ-lactone. More particularly, this invention relates to 7'-hydroxymethyl, 7'-formyl, 7'-carboxy and 7'-carbomethoxymethyl derivatives of zearalane and to 2-mono-, 4-mono- and 2,4-diether derivatives thereof; to 2-mono-, 4-mono- and 2,4-diester derivatives thereof; to 2-desoxy and 5-nitro derivatives thereof; to methods of preparing such compounds and to the use of such compounds as estrogenic and anabolic agents.

The novel compounds of this invention may be represented by the following structural formula:

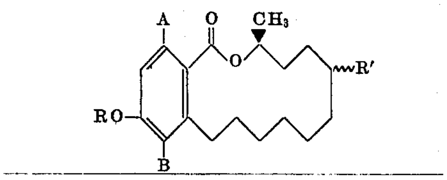

wherein A is member selected from the group consisting of hydrogen, hydroxy and —OR; R is a member of the group consisting of hydrogen, loweralkyl, aralkyl, loweralkanoyl and benzoyl; B is a member of the group consisting of hydrogen and nitro, provided that B cannot be nitro when A is hydrogen; and R' is a member of the group consisting of $-CH_2OH$, $-CHO$, $-COOR''$ and $-CH_2-COOR''$ wherein R'' is a member selected from the group consisting of hydrogen, loweralkyl and aralkyl. It will be appreciated by those skilled in the art that the carbon atom at the 7'-position in the above formula is asymmetric and that there are, therefore, two diasterioisomers of the compounds of this invention.

The instant invention is based upon applicants' discovery that the compounds described above display valuable anabolic and estrogenic activity. It is contemplated that dosage units containing these compounds as the essential active ingredient will be administered either orally or parenterally to animals to achieve an anabolic and esterogenic response such as increasing the rate of growth of meat producing animals.

As used herein, the terms, loweralkyl and loweralkanoyl, are intended to include both straight and branched-chain loweralkyl and loweralkanoyl groups having from one to six carbon atoms in the alkyl moiety. Typical of such groups are, for example, methyl, ethyl, propyl, isopropyl, butyl, n-hexyl, formyl, acetyl, isopropionyl, n-butyryl, and the like. The preferred aralkyl group is benzyl.

As the starting material in the preparation of the novel zearalanes of this invention, applicants employ zearalenone 2,4-dibenzyl ether. This is a well-known compound and is readily obtained from zearalenone by etherification techniques already fully described in the art.

Applicants have found that zearalenone 2,4-dibenzyl ether readily can be converted into 7'-formylzearalane via a four-step synthesis which first involves treatment of zearalenone 2,4-dibenzyl ether with ethyl formate in the presence of a strong base such as, for example, sodium hydride, alkali and alkaline-earth metal hydroxides, sodamide, alkali metal alkoxides, and the like in order to produce 7'-hydroxymethylenezearalenone 2,4-dibenzyl ether (which compound, of course, may exist also in tautomeric form as 7'-formylzearalenone 2,4-dibenzyl ether. The reaction proceeds satisfactorily at about room temperature and is carried out in a suitable dry organic solvent such as, for example, benzene, toluene, ethylene glycol dimethyl ether, hexane and the like. Usually, from about 12 to about 24 hours is required for completion. Applicants have found that the reaction is most satisfactorily carried out using sodium hydride as the base and benzene as the solvent. After decomposition of any excess sodium hydride in the reaction mixture by the addition of water, the product may be recovered from an ether extract in the conventional manner. Preferably, the product is employed in the next stage of the synthesis without further purification.

7'-Hydroxymethylenezearalenone 2,4-dibenzyl ether as obtained above is then treated with an aliphatic alcohol, preferably with cyclohexanol, to form the corresponding 7'-ether. Thus, 7'-hydroxymethylenezearalenone 2,4-dibenzylether may be treated with cyclohexanol to prepare 7'-cyclohexyloxymethylenezearalenone 2,4-dibenzyl ether. The reaction is carried out in a dry organic solvent, benzene being preferred, at reflux temperature and usually requires from about 12 to about 48 hours for completion. Desirably, the reaction is carried out in the presence of a catalytic quantity of a strong organic acid such as, for example, p-toluene sulfonic acid and trifluoroacetic acid. The product obtained by removal of volatiles from the reaction mixture may be purified by conventional column chromatography using, for example, silica gel and eluting with solvent mixtures such as 10 percent ethyl acetate in benzene.

The 7'-ether intermediate obtained above is then converted into 6'(7')-dehydro-7'-formylzearalene 2,4-dibenzyl ether by treating the 7'-ether with a reducing agent such as, for example sodium borohydride or lithium-aluminum hydride followed by treatment of residue from this reaction with a strong mineral acid such as hydrochloric and sulfuric acids. Both reactions are carried out in a suitable organic solvent such as methanol, ethanol ether, benzene and the like and both may be carried out at room temperature. The 6'(7')-dehydro-7'-formylzearalene 2,4-dibenzyl ether so obtained may be purified by conventional column chromatography as indicated above.

7'-Formylzearalane then is prepared by subjecting 6'(7')-dehydro-7'-formylzearalene 2,4-dibenzyl ether to conventional catalytic hydrogenation. Applicants have found that this reduction selectively saturates the double bonds at the 1'(2')- and 6'(7')-positions without saturation of the benzenoid moiety and simultaneously cleaves the dibenzyl ether groups at positions 2 and 4. The reaction may be carried out at atmospheric pressure and at ambient temperatures in a suitable organic solvent, such as benzene and ethyl acetate, and in the presence of a conventional hydrogenation catalyst such as 10 percent palladium-on-carbon. The desired 7'-formylzearalane is recovered from the reaction mixture, after separation of the catalyst, by removal of the solvent and is purified by column chromatography over silica gel using 10–20 percent ethylacetate in benzene as the eluant.

As indicated above, the carbon tom at the 7'-position in 7'-formylzearalane is asymmetric. This compound, therefore, exists in two diastereo isomeric forms. It will be understood that the 7'-formylzearaland as obtained in the reactions described above, is obtained as a mixture of the two isomeric forms. Applicants have found that the isomers may be separated by fractional crystallization from benzene. The least soluble isomer, isomer A, separates upon cooling to room temperature from a hot saturated solution of the epimeric mixture in benzene. The more soluble isomer, isomer B, is precipitated from the benzene filtrate obtained after separation of isomer A by dilution of the filtrate with hexane. Both isomers may be purified by chromatography over silica gel followed using 10–20percent ethyl acetate in benzene as eluant. Recrystallization from benzene yields pure isomer A (m.p. 140°–142° C.) and pure isomer B (m.p. 148°–152° C.).

Preparation of those 7'-formylzearalanes of this invention which have an alkoxy or aralkoxy group at the 2- and 4-positions may be achieved readily according to techniques already fully described in the art by treating 7'-formylzearalane with a dialkyl- or diaralkyl sulfate in an aqueous basic medium. Thus, for example, 7'-formylzearalane in aqueous sodium hydroxide may be treated with dimethyl sulfate to prepare 2,4-dimethox- y-7'-formylzearalane. The reaction may be carried out at temperatures ranging from about 15° C. to about room temperature and is usually complete in about 30 minutes to 2 hours. The precipitated diether is recovered by filtration and is purified by recrystallization in the conventional manner.

It has been found also that upon acidification of the filtered reaction mixture obtained above, there is obtained a second precipitated product which may be recovered by filtration and purified in the usual way. This second product is the 2-monoalkyl (or 2-monoaralkyl) ether of 7'-formylzearalane. The reaction described above, therefore, affords a route to both the 2,4-diethers and 2-monoethers of zearalane, it will be understood that in order to prepare any particular 2,4-diether or 2-monoether it is necessary merely to employ the appropriate dialkyl or diaralkyl sulfate as the alkylating reagent.

The 7'-formylzearalanes of this invention having a 4-monoalkyl ether or a 4-monoaralkyl ether group conveniently are prepared from the corresponding 2,4-diether by selective hydrolysis. This may be effected by treating the diether in a suitable organic solvent such as methylene chloride with either boron tribromide or boron trichloride at about −10° to about −15° C., preferably under an inert atmosphere such as nitrogen. The hydrolysis of the ether radical at the 2-position is essentially instantaneous and, accordingly, the diether is contacted only momentarily with the boron trihalide, i.e., preferably for less than 1 minute. The 4-monoether is isolated by removal of the solvent and recrystallization from a suitable organic solvent such as nitromethane.

7'-formylzearalanes of this invention having a loweralkanoyloxy or benzoyloxy substituent at the 2- and 4-positions may be prepared by subjecting 7'-formylzearalane to the action of an acylating agent. Conveniently, the acylation is carried out by treating the 7'-formylzearalane, dissolved in a suitable organic solvent such as pyridine, with an acid anhydride. Thus a pyridine solution of 7'-formylzearalane may be treated with acetic anhydride in order to obtain 2,4-diacetoxy-7'-formylzearalane. The reaction may be carried out at room temperature and usually is complete in 4–12 hours. The diester may be recovered from the reaction mixture by pouring the reaction mixture over ice, extracting the resulting mixture with ether, drying the extract and conventional recrystallization. It will be understood that it is necessary merely to select the appropriate acid anhydride as the acylating agent in order to prepare any of the diesters of this invention.

Those of the 7'-formyzearlanes of this invention having a monoloweralkanoyl or a monobenzoyl ester grouping at the 2- or 4-positions may be prepared by subjecting a 2-monoether or 4-monoether derivative of 7'-formylzearalane to acylation according to the technique described above in order to prepare the corresponding 2-monoether-4-ester or 2-ester-4monoether derivative. These mixed ether-ester derivatives which also are included within the scope of this invention then may be subjected to boron trihalide hydrolysis as described above in order to obtain the desired 2- or 4-monoester derivative.

Mixed 2,4-diether and 2,4-diester derivatives of 7'-formylzearalane are readily prepared from a 2- or 4-monoether or from a 2- or 4-monoester by the etherification or esterification techniques described above. Thus for example, 2-methoxy-4-ethoxy-7'-formylzearalane may be prepared by treating 2-methoxy-7'-zearalane with diethylsulfate and 2-acetoxy-4-propionyloxy-7'-formylzearalane may be prepared by treating 2-acetoxy-7'-formyl-formylzearalane with propionic anhydride according to the techniques already fully described.

It will be understood that where it is desired to obtain any of the ether or ester derivatives described above in their individual isomeric forms, it is necessary only to subject an epimeric mixture to fractional crystallization techniques, such as described above, or to employ the desired 7'-formylzearalane isomer as the starting material in the etherification or esterfication reaction. The 7'-formylzearalanes described above, together with their ether and ester derivatives, display valuable anabolic and estrogenic activity and serve also as key intermediates in the preparation of the ether novel zearalanes of this invention.

The 7'-carboxyzearalanes of this invention may be prepared by oxidation of 7'-formylzearalane with standard Jones Reagent (26.7 g. of chromium trioxide in 23 ml. of concentrated sulfuric acid brought to a volume of 100 ml. with water). The reaction is carried out in a suitable organic solvent such as, for example acetone, benzene, chloroform and the like, at temperatures ranging between −20° C. to 10° C. Even at these low temperatures, the reaction proceeds rapidly and usually is complete in form about 5 to about 20 minutes. The 7'-carboxyzearalane so produced may be purified by conventional thin-layers chromatography on silica gel plates. Ether and ester derivatives of 7'-carboxyzearalane may be prepared by the esterification and etherification processes described above or by selecting the appropriately substituted 7'-formylzearalane as starting material.

The 7'-hydroxymethylzearalanes of this invention may be obtained by treating 7'-carboxyzearalane with a reducing agent such as, for example, sodium borohydride and lithium-aluminum hydride. The reaction proceeds satisfactorily at room temperature in an organic solvent such as, for example, methanol, ethanol, dioxane and the like and is usually complete in from about 1 to about 2 hours. Removal of the solvent in vacuo followed by ether extraction yields a crude residue which may be purified by conventional thin-layer chromatography. Ether and ester derivatives of 7'-hydroxymethylzearalane may be prepared by the techniques described above or by employing an appropriately substituted 7'-carboxyzearalane as the starting material.

Applicants have found that the side chain in the 7'-position of the 7'-carboxyzearalanes of this invention may be extended by one carbon atom to obtain the corresponding 7'-carboxymethylzearalanes and that these compounds, together with their 7'-carbomethoxyloweralkyl (and aralkyl) ester derivatives, display the same anabolic and estrogenic activity as the 7'-carboxyzearalanes. These 7'-carboxymethylzearalanes may be prepared by treating 7'-hydroxymethylzearalane or an ether or ester derivative thereof, such as described above with p-toluenesulfonylchloride in a dry organic solvent such as pyridine to form the corresponding 7'-p-toluenesulfonyloxymethylzearalane which, after isolation from the reaction mixture as a crude, is treated with an alkali metal cyanide in a solvent such as dimethylformamide or ethylene glycol dimethyl ether to form the corresponding 7'-cyanomethylzearalane. This compound also may be isolated from the reaction mixture as a crude and, without further purification, treated with a lower alkanol (or aralkanol) in the presence of gaseous hydrogen chloride to form the corresponding zearalane 7'-acetimidic acid loweralkyl (or aralkyl) ether which then may be treated in situ with water to form the desired 7'-carboalkoxy(or aralkoxy)methylzearalane. The corresponding 7'-carboxymethylzearalanes are obtained readily by conventional basic hydrolysis of the preceding 7'-ester.

The novel zearalanes of this invention having a nitro group in the 5-position are prepared by treating the parent zearalane, or an ether or ester derivative thereof, with concentrated nitric acid. The reaction preferably is run at a temperature of about 10° C. and is usually complete in from about 30 minutes to 2 hours. The crude 5nitro zearalane is separated from the reaction mixture by filtration and may be purified by conventional recrystallization.

Preparation of the 2-desoxy zearalanes of this invention may be achieved by treating 7'-formylzearalane with commercial dihydropyran to form 7'-formylzearalane 4-tetrahydropyranyl ether which then may be treated with 1-phenyl-5-chlorotetrazole to form the corresponding 7'-formylzearalane 2-(1-phenyltetrazolyl) ether-4-tetrahydropyranyl ether. Applicants have found that catalytic hydrogenation of this diether followed by treatment with dilute mineral acid results in cleavage of oxygen function at the 2-position with simultaneous cleavage of the ester group at the 4-position and reduction of the 7'-formyl group to hydroxymethyl yielding 2-desoxy-7'-hydroxymethylzearalane.

Those 2-desoxy zearalanes of this invention having a formyl group or a carboxy group in the 7'-position are prepared by oxidation of 7'-hydroxymethylzearalane with Jones Reagent according to the techniques described above. One-quarter milliliter of standard Jones Reagent is required for conversion of each millimole of 7'-hydroxymethylzearalane to 7'-formylzearalane and ½ milliliter of this reagent is required for conversion of each millimole of the hydroxy methyl compound to 7'-carboxyzearalane.

Preparation of 2-desoxy zearalanes having an ether or ester group in the 4-position may be carried out by subjecting 2-desoxy-7'-formylzearalane to the conventional etherification or esterification procedures described above. These 2-desoxy-7'-formylzearalane ethers or esters may then be converted to the corresponding 7'-hydroxymethyl compound by reduction (with sodium hydride, for example) or to the corresponding 7'-carboxy compound by oxidation (with Jones Reagent) according to the procedures previously described.

As pointed out above, the novel zearalanes of this invention display valuable anabolic and estrogenic activity and may be used to achieve an anabolic and esterogenic response such as increasing the rate of growth of meat producing animals. These compounds can be administered to animals by any suitable method including oral and parenteral administration. They may be blended with ordinary animal feeds containing the usual nutritionally balanced diet of carbohydrates, proteins, vitamins and minerals in an amount sufficient to produce the desired rate of growth and thus can be fed directly to the animals. Also, if desired, the compounds of this invention may be suspended in a suitable injectable suspension medium and injected parenterally. The amount of compound administered to the animal, of course, will vary depending upon the animal and the desired rate of growth. Usually, administration of from about 5 to about 100 mg. per animal per day results in significantly increased growth rate.

The best mode contemplated by applicants for carrying out their invention is set forth in the following examples; it being understood that the examples are included for purposes of illustration merely.

EXAMPLE 1

7'-Hydroxymethylenezearalenone 2-4,Dibenzyl Ether

Treat 19 g. of zearalenone 2,4-dibenzyl ether with 4.2 g. of 54 percent sodium hydride/mineral oil in 300 ml. of dry benzene and 1 ml. of dry t-butanol followed by 9.6 ml. of ethyl formate. Stir for 18 hrs. at room temperature and add an additional 3 ml. of ethyl formate. Continue stirring at room temperature for 3 hrs. and add 7 ml. of water to decompose the mixture. Isolate the product by acidifying the water layer, extracting the mixture with ether. Dry the ether extract and concentrate to a gummy residue.

Dissolve 14.5 g. of the product obtained above in a mixture of 3.6 ml. of cyclohexanol, 50 mg. of p-toluene sulfonic acid and 350 ml. of benzene and reflux for 45 hrs. using a water separator filled with molecular sieves for water removal. Cool the reaction mixture and wash with 1000 ml. of saturated brine containing 100 ml. of 2.5 N sodium hydroxide. Dry the residue with magnesium sulfate and concentrate to 15 g. of oil. Chromatograph the oil on silica gel using 10 percent ethyl acetate in benzene to obtain pure 7'-cyclohexyloxymethylenezearalenone 2,4-dibenzyl ether.

EXAMPLE 2

6'(7')-Dehydro-7'-Formylzearalene 2,4-Dibenzyl Ether

Add 2.5 g. of sodium borohydride to a solution of 5.7 g. of 7'-cyclohexyloxymethylenezearalenone 2,4-dibenzyl ether in 110 ml. of methanol. Stir for 1.5 hrs. and remove the solvent in vacuo. Take up the residue in a mixture of 200 ml. of ether and 200 ml. of water. Separate the ether layer and washed with saturated brine, dry with magnesium sulfate and concentrated to 5.5 g. of residue. Stir the residue under nitrogen with 100 ml. of ether and 100 ml. of 3 N. hydrochloric acid for 4 hrs. Add 200 ml. of ether. Separate the ether layer, wash with saturated brine, dry with magnesium sulfate and concentrate to 5 g. of residue. Chromatograph the residue on silica gel using 10 percent ethyl acetate in benzene to obtain pure 6'(7')-dehydro-7'-formylzearalene 2,4-dibenzyl ether.

EXAMPLE 3

7'-Formylzearalane

Hydrogenate 2.2 g. of 6'(7')-dehydro-7'-formylzearalene 2,4-dibenzyl ether in 50 ml. of ethyl acetate at atmospheric pressure over 10 percent palladium on carbon catalyst. When the theoretical amount of hydrogen is taken up, stop the reaction and remove the catalyst by filtration. Remove the solvent in vacuo and chromatograph the residue over silica gel using 10–20 percent ethyl acetate in benzene to obtain pure 7'-formylzearalane.

Dissolve the crude product obtained above, prior to chromatography, in hot benzene to form a saturated solution. Cool to room temperature and separate the insolubles to obtain crude 7'-formylzearalane isomer A. Dilute the filtrate with hexane and separate the insolubles to obtain 7'-formylzearalane isomer B. Purify both isomers by chromatography over silica gel eluting with 10 percent ethyl acetate in benzene. Evaporate the eluate to dryness in vacuo and recrystallize the residue from benzene to obtain isomer A (m.p. 140°–142° C.) and isomer B (m.p. 148°–152° C.).

EXAMPLE 4

7'-Carboxyzearalane

Dissolve 291 mg. of 7'-formylzearalane in 15 ml. of acetone and cool to 0° C. Add 0.25 ml. of standard Jones Reagent (26.7 g. of chromium trioxide in 2.3 ml. of concentrated sulfuric acid brought to 100 ml. with water) and mix for 8 min. Add 5 ml. of methanol to decompose the mixture and remove the solvent in vacuo. Take up the residue in a mixture of 20 ml. of water. Separate the ether layer, wash with saturated brine, dry with magnesium sulfate and concentrate to 0.3 g. of residue. Purify by chromatography on silica gel plates using 10 percent ethyl acetate in benzene to obtain 7'-carboxyzearalane.

EXAMPLE 5

7'-Hydroxymethylzearalane

Dissolve 340 mg. of 7'-formylzearalane in 10 ml. of methanol and add 0.26 g. of sodium borohydride in small portions with stirring over a period of 2 mins. Stir at room temperature for 1.25 hours and remove the solvent in vacuo. Take up the residue in a mixture of 30 ml. of ether and 30 ml. of 5 percent hydrochloric acid. Separate the ether layer, wash with saturated brine, dry with magnesium sulfate and concentrate to dryness to obtain 7'-hydroxymethylzearalane. Purify by thin -layer chromatography on silica gel plates using 10 percent ethyl acetate in benzene as the eluant to obtain 7'-hydroxymethylzearalane.

EXAMPLE 6

7'-Carbomethoxymethylzearalane

Dissolve 0.34 g. of 7'-hydroxymethylzearalane in 5 ml. of dry pyridine. Cool the mixture on an ice bath and add with stirring 0.76 g. of -toluenesulfonylchloride. Allow the mixture to stand at room temperature for 15 hrs. and pour into 50 ml. of ice water. Separate the insolubles by filtration and dissolve in chloroform. Wash the chloroform solution with dilute hydrochloric acid and saturated brine. Dry the washed solution over magnesium sulfate and remove the solvent in vacuo.

Take up the residue obtained above in 5 ml. of dimethylformamide and add 0.32 g. of potassium cyanide. Heat the mixture on a steam bath for 24 hrs., cool and pour into 50 ml. of water. Separate the insolubles by filtration and dissolve in chloroform. Wash the chloroform solution four times with water, dry over magnesium sulfate and remove the solvent in vacuo.

Dissolve the residue obtained above in 10 ml. of absolute methanol and bubble hydrogen chloride through the mixture at temperatures below 40° C. with stirring for 30 mins. Reflux the mixture for 90 mins. and then distill away 8 ml. of methanol. Add 10 ml. of water and stir at room temperature for 15 hrs. Extract the reaction mixture with chloroform, wash the chloroform extract with water, dry over magnesium sulfate and remove the solvent in vacuo. Purify the residue by thin-layer chromatography on four 1,000$\mu$ silica gel plates using 10 percent ethyl acetate in hexane as an eluant to obtain 7'-carbomethoxymethylzearalane.

EXAMPLE 7

7'-Carboxymethylzearalane

Dissolve 0.38 g. of 7'-carbomethoxymethylzearalane in 11.5 ml. of 0.1N sodium hydroxide. Warm the mixture on a steam bath for 1 hr., cool and acidify with hydrochloric acid. Collect the insolubles on a filter and purify by thin-layer chromatography on four 1,000$\mu$ silica gel plates using 10 percent methanol in chloroform as an eluant to obtain 7'-carboxymethylzearalane.

EXAMPLE 8

5-Nitro-7'-Carboxyzearalane

To 10 gm. of 7'-carboxyzearalane, add 10 ml. of cool (10° C.) concentrated nitric acid. Stir the mixture at 15°C. for 1 hr. and pour into 100 ml. of ice water. Collect the insolubles on a filter. Purify by recrystallization from nitromethane to obtain 5-nitro-7'-carboxyzearalane.

EXAMPLE 9

5-Nitro-7'-Hydroxymethyzearalane

Repeat the process of example 5 substituting an equivalent quantity of 5-nitro-7'carboxyzearalane for the 7'-formylzearalane to obtain 5-nitro-7'-hydroxymethylzearalane.

EXAMPLE 10

5-Nitro-7'-Formylzearalane

Repeat the process for example 4 substituting an equivalent quantity of 7'-hydroxymethylzearalane for the 7'-formylzearalane to obtain 5-nitro-7'-formylzearalane.

EXAMPLE 11

5-Nitro-7'-Carboxymethylzearalane

Repeat the process of example 8 substituting an equivalent quantity of 7'-carboxymethylzearalane for the 7'-formylzearalane to obtain 5-nitro-7'-carboxymethylzeralane.

EXAMPLE 12

2-Desoxy-7'-Hydroxymethylzearalane

A. 740 -Formylzearalane 4-Tetrahydropyranyl Ether

Add 3 g. of 7'-formylzearalane to 8 ml. of dihydropyran and 4 drops of concentrated hydrochloric acid. Stir 4 hrs. at room temperature and add an additional 8 ml. of dihydropyran. Stir for an additional 48 hrs. at room temperature. Remove excess dihydropyran in vacuo and purify the residue by column chromatography on 200 gm. of silica gel using 10 percent ethyl acetate in benzene as an eluant to obtain 7'-formylzearalane 4-tetrahydropyranyl ether.

B. 7'-Formylzearalane 2-(1-Phenyltetrazolyl) Ether-4-Tetrahydropyranyl Ether

To a mixture of 1.33 g. of 7'-formylzearalane 4-tetrahydropyranyl ether, 0.54 g. of 1-phenyl-5-chlorotetrazole and 0.83 g. of anhydrous potassium carbonate, add 5 ml. of acetone. Reflux and stir the mixture under nitrogen for 3 days. Filter the mixture and remove the solvent from the filtrate in vacuo. Purify by column chromatography on silica gel (100 g.) using 10 percent ethyl acetate in benzene as the eluant to obtain 7'-formylzearalane 2-(1-phenyl-tetrazolyl) ether-4-tetrahydropyranyl ether.

C. 2-Desoxy-7'-Hydroxymethylzearalane

Shake 1.1 g. of the diether obtained instep C above with 200 mg. of 5 percent platinum-on-carbon catalyst in 200 ml. of 95 percent ethanol for 48 hrs. at 70° C. under 50 p.s.i. hydrogen pressure. Remove the insolubles by filtration and evaporate the solvent from the filtrate in vacuo. Add 50 ml. of chloroform and b 1 ml. of concentrated hydrochloric acid to the residue. Stir and warm the mixture on a steam bath for 15 mins. Remove the solvent in vacuo. Purify by column chromatography on 200 mg. of basic alumina (MERCK & CO., Inc., Rahway, New Jersey, U.S.A.) eluting first with ethers to remove phenyltetrazole and then with 10 percent methanol in chloroform to obtain 2-desoxy-7-7'-hydroxymethylzearalane.

EXAMPLE 13

2-Desoxy-7'-Formylzearalane

Repeat the process of example 4 substituting an equivalent quantity of 2-desoxy-7'-hydroxymethylzearalane for the 7'-formylzearalane in order to obtain 2-desoxy-7'-formylzearalane.

EXAMPLE 14

2-Desoxy-7'-Carboxyzearalane

Repeat the process of example 4 substituting an equivalent quantity of 2-desoxy-7'-hydroxymethylzearalane for the 7'-formylzearalane and using 0.5 ml. of Jones' Reagent in order to obtain 2-desoxy-7'-carboxyzearalane.

EXAMPLE 15

7'-Formylzearalane 2,4-Dimethyl Ether

Add 5 ml. of dimethyl sulfate to a solution of 2 g. of 7'-formylzearalane in 80 ml. of 10 percent sodium hydroxide and 20 ml. of water. Stir the mixture for 30 min. at 20° C. and add an additional 5 ml. of dimethyl sulfate. Stir for an additional 90 min. at b 25° C. Separate the solid precipitate by filtration, wash with water and dry. Purify by recrystallization from ethanol to obtain 7'-formylzearalane 2,4-dimethyl ether.

By substituting an equivalent quantity of a diaklyl or a diaralkyl sulfate such as, for example, diethyl sulfate, diisopropyl sulfate, diamyl sulfate, dihexylsulfate and dibenzyl sulfate for the dimethyl sulfate employed in the process described above, the corresponding 2,4-diethyl, 2,4-diisopropyl, 2,4-diamyl, 2,4-dihexyl and 2,4-dibenzyl ether derivatives of 7'-formylzearalane can be prepared.

EXAMPLE 16

7'-Formylzearalane 2-Methyl Ether

Acidify the filtrate obtained after the separation of the precipitate from the reaction mixture of example 15 with 25 ml. of 12 *N* sulfuric acid. Separate the precipitate by filtration, wash with water and dry. Purify the recrystallization from a mixture of ethanol and water to obtain 7'-formylzearalane 2-methyl ether.

EXAMPLE 17

7'-Formylzearalane 4-Benzyl Ether

To a stirred solution of 480 mg. of 7'-formyl 2,4-dibenzyl ether in 5 ml. of methylene chloride under a nitrogen atmosphere at 0° C. add a cold solution of 2 ml. of boron tribromide in 2 ml. of methylene chloride. Pour the reaction mixture immediately onto 50 ml. of crushed ice with stirring. Make the reaction mixture basic with potassium bicarbonate and extract with methylene chloride. Wash the extract with saturated brine, dry over magnesium sulfate and concentrate to dryness in vacuo. Purify by recrystallization from nitromethane to obtain 7'-formylzearalane 4-benzyl ether.

By substituting 7'-formylzearalane 2,4-dialkyl (or diaralkyl) ethers such as for example, the 2,4-dimethyl 2,4-diethyl, 2,4-dibutyl and 2,4-dihexyl ethers for the dibenzyl ether employed above, the corresponding 4-methyl 4-ethyl, 4-butyl and 4-hexyl ether derivatives of 7'-formylzearalane can be prepared.

EXAMPLE 18

7'-Formylzearalane 2,4-Diacetate

Dissolve 24 g. of 7'-formylzearalane in 150 ml. of pyridine and add 14.4 ml. of acetic anhydride. Stir for 12 hrs. at room temperature. Pour the reaction mixture into 1,000 ml. of ice water and extract with 500 ml. of ether. Wash the ether extract with dilute hydrochloric acid and with water. Dry the washed extract over magnesium sulfate and concentrate to dryness. Recrystallize from ethanol to obtain 7'-formylzearalane 2,4-diacetate.

By substituting an alkanoyl or aralkenoyl anhydride such as, for example, propionic anhydride, butyric anhydride, hexanoic anhydride and benzoic anhydride for the acetic anhydride employed in the above process the corresponding 2,4-dipropionate, 2,4-dibutyrate, 2,4-dihexanoate and 2,4-dibenzoate ester derivatives of 7'-formylzearalane can be prepared.

EXAMPLE 19

7'-Formylzearalane 2-Methyl Ether-4-Acetate

Dissolve 12 g. of 7'-formylzearalane 2-methyl ether in 80 ml. of pyridine and add 8 ml. of acetic anhydride. Stir for 12 hrs. at room temperature Pour the reaction mixture into 500 ml. of ice water and extract with 500 ml. of ether. Wash the ether extract wit dilute hydrochloric acid and with water. Dry the ether extract over magnesium sulfate and concentrate to dryness. Recrystallize from ethanol to obtain 7'-formylzearalane 2-methylether -4-acetate.

EXAMPLE 20

7'-Formylzearalane 4-Ethyl Ether -2-Benzoate

Repeat the process for example 19 substituting an equivalent quantity of 7'-formylzearalane 4-ethyl ether for the 7'-formylzearalane 2-methyl ether and an equivalent quantity of benzoic anhydride for the acetic anhydride to obtain 7'-formylzearalane 4-ethyl ether-2-benzoate.

EXAMPLE 21

7'-Formylzearalane 4-Acetate

To a stirred solution of 500 mg. of 7'-formylzearalane 2-methyl ether-4-acetate in 7 ml. of methylene chloride under nitrogen at 0° C., add a cold solution of 2 ml. of boron tribromide in 2 ml. of methylene chloride. Pour the reaction mixture immediately on to 50 ml. of crushed ice with stirring. Make the reaction mixture basic with potassium bicarbonate and extract with methylene chloride. Wash the extract with saturated brine, dry over magnesium sulfate and concentrate to dryness in vacuo. Purify by recrystallization from nitromethane to obtain 7'-formylzearalane 4-acetate.

EXAMPLE 22

7'-Formylzearalane 2-Benzoate

Repeat the process of example 21 substituting an equivalent quantity of 7'-formylzearalane 4-ethyl ether-2-benzoate for the 7'-formylzearalane 2-methyl ether-4-acetate to obtain 7'-formylzearalane 2-benzoate.

EXAMPLE 23

7'-Formylzearalane 2-Methyl Ether-4-Ethyl Ether

To a solution of 2 g. of 7'-formylzearalane 2-methyl ether 80 ml. of 10 percent potassium hydroxide and 20 ml. of water, add 5 ml. of diethyl sulfate. Stir the mixture for 30 mins. at 20° C. and allow the mixture to warm to 25° C. with continued stirring for an addiitonal 90 mins. Separate the precipitate by filtration, wash with water and dry. Recrystallize from ethanol to obtain 7'-formylzearalane 2-methyl ether-4-ethyl ether.

EXAMPLE 24

7'-Formylzearalane b 2-Acetate-4-Propionate

Dissolve 6 g. of 7'-formylzearalane 2-acetate in 40 ml. of pyridine and add 4 ml. of propionic anhydride. Stir for 12 hrs. at room temperature. Pour the reaction mixture into 250 ml. of ice water and extract with 300 ml. of ether. Wash the ether extract with dilute hydrochloric acid and with water. Dry the washed extract over magnesium sulfate and concentrate to dryness. Recrystallize from methanol to obtain 7'-formylzearalane 2-acetate-4-propionate.

EXAMPLE 25

2-Desoxy-7'-Formylzearalane 4-Methyl Ether

Repeat the process for example 15 substituting an equivalent quantity of 2-desoxy-7'-formylzearalane for the 7'-formylzearalane to obtain 2desoxy-7'-formylzearalane 4-methyl ether.

EXAMPLE 26

2-Desoxy-7'-Carboxyzearalane 4-Methyl Ether

Repeat the process of example 4 substituting an equivalent quantity of 2-desoxy-7'-formylzearalane 4-methyl ether for the 7'-formylzearalane to obtain 2-desoxy-7'-carboxy zearalane 4-methyl ether.

EXAMPLE 27

2-Desoxy-7'-Hydroxymethylzearalane 4-Methyl Ether

Repeat the process of example 5 substituting an equivalent quantity of 2-desoxy-7'-formylzearalane to obtain 2-desoxy-7'-hydroxymethylzearalane 4-methyl ether.

Although applicants have described their invention above wit reference to particular embodiments, many modifications will suggest themselves to those skilled in the art from a study of the foregoing description. Applicants consider all such modifications to be the full equivalent of the embodiments specifically described and to fall within the scope of their invention.

The subject matter which applicants regard as their invention is particularly pointed out and distinctly claimed as follows.

What is claimed is:

1. A compound of the formula:

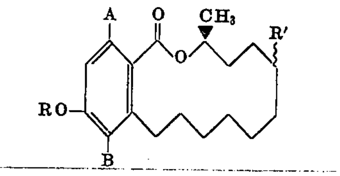

wherein A is a member selected from the group consisting of hydrogen, hydroxy and —OR; R is a member of the group consisting of hydrogen, loweralkyl, benzyl, loweralkanoyl and benzoyl; B is a member of the group consisting of hydrogen and nitro, provided that B cannot be nitro when A is hydrogen; and R' is a member of the group consisting of $-CH_2OH$, $-CHO$, $-COOR''$ and $-CH_2-COOR''$ wherein R'' is a member of the group consisting of hydrogen, loweralkyl and benzyl.

2. A compound of claim 1 wherein A is hydrogen.

3. A compound of claim 1 wherein B is nitro.

4. A compound of claim 2 wherein R' is $-CH_2OH$.

5. A compound of claim 2 wherein R' is —CHO.

6. A compound of claim 2 wherein R' is —COOR'' and R'' is a member selected from the group consisting of hydrogen, loweralkyl and benzyl.

7. A compound of claim 2 wherein R' is $-CH_2-COOR''$ and R'' is a member selected from the group consisting of hydrogen, loweralkyl, and benzyl.

8. A compound of claim 3 wherein R' is $-CH_2OH$.

9. A compound of claim 3 wherein R' is —CHO.

10. A compound of claim 3 wherein R' is —COOR'' and R'' is a member selected from the group consisting of hydrogen, loweralkyl and benzyl.

11. A compound of claim 3 wherein R' is $-CH_2-COOR''$ and R'' is a member selected from the group consisting of hydrogen, loweralkyl and benzyl.

12. 7'-Formylzearalane.

13. 7'-Hydroxymethylzearalane.

14. 7'-Carboxyzearalane.

15. 7'-Carboxymethylzearalane.

16. A process for preparing 7'-formylzearalane which comprises:

a. treating zearalenone 2,4-dibenzyl ether with ethyl formate in the presence of a strong base in order to obtain 7'-hydroxymethylenezearalenone 2,4-dibenzyl ether; and b. treating said 7'-hydroxymethylenezearalenone 2,4-dibenzyl ether with cyclohexanol to form the corresponding 7'-ether; and c. treating said 7'-ether intermediate with a reducing agent followed by treatment of the residue with a strong mineral acid to obtain 6'(7')-dehydro-7'-formylzearalene 2,4-dibenzyl ether; and d. hydrogenating said 6'(7')-dehydro-7'-formylzearalene 2,4-dibenzyl ether in the presence of a hydrogenation catalyst.

17. The process of claim 17 wherein the reducing agent is sodium borohydride.

* * * * *